(12) United States Patent
Ra et al.

(10) Patent No.: US 7,623,444 B2
(45) Date of Patent: Nov. 24, 2009

(54) APPARATUS AND METHOD FOR REDUNDANCY CONTROL OF DUPLEX SWITCH BOARD

(75) Inventors: YongWook Ra, Jeollabuk-do (KR); Byungjun Ahn, Daejeon (KR); Hae-Won Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 882 days.

(21) Appl. No.: 11/172,331

(22) Filed: Jun. 30, 2005

(65) Prior Publication Data
US 2006/0109782 A1    May 25, 2006

(30) Foreign Application Priority Data
Nov. 25, 2004    (KR) .................... 10-2004-0097698

(51) Int. Cl.
*H04J 1/16* (2006.01)
*G06F 11/00* (2006.01)
*G06F 1/30* (2006.01)
*H04L 1/24* (2006.01)

(52) U.S. Cl. ................ 370/220; 713/400; 713/600; 714/2

(58) Field of Classification Search ......... 370/216–220; 714/1, 2, 11, 12, 14; 713/320, 375, 400, 713/600; 375/354
See application file for complete search history.

(56) References Cited

U.S. PATENT DOCUMENTS

| | | | |
|---|---|---|---|
| 6,078,225 A * | 6/2000 | Bontekoe et al. | 331/14 |
| 6,256,360 B1 * | 7/2001 | Wilhelmsson et al. | 375/354 |
| 6,925,052 B1 * | 8/2005 | Reynolds et al. | 370/217 |
| 6,973,026 B1 * | 12/2005 | Dyrga et al. | 370/218 |
| 7,051,235 B2 * | 5/2006 | Wu | 714/20 |
| 7,054,263 B1 * | 5/2006 | Lindblom et al. | 370/219 |
| 7,085,226 B1 * | 8/2006 | Jung et al. | 370/219 |
| 7,200,107 B2 * | 4/2007 | Kloth | 370/220 |

(Continued)

FOREIGN PATENT DOCUMENTS

JP    06053943 A   *   2/1994

(Continued)

OTHER PUBLICATIONS

PICMG 3.0 R1.0 Advanced TCA Specification, Dec. 30, 2002 (pp. 271-320).

(Continued)

*Primary Examiner*—Chi H Pham
*Assistant Examiner*—Ahmed Elallam
(74) *Attorney, Agent, or Firm*—Blakely, Sokoloff, Taylor & Zafman LLP (57) ABSTRACT

An apparatus and method for a redundancy control in duplex switch boards in a high speed network system are provided. The apparatus includes: a switching unit for switching data inputted one of the duplex switch boards to a destination line card; a state controlling unit for controlling a clock state of an opponent switch board between the duplex switch boards; an IPC controlling unit for controlling an inter processor communication (IPC) of a platform of the communication network system; a processing unit for controlling the IPC controlling unit and the state controlling unit of the duplex switch boards; and a clock controlling unit for synchronizing a clock between the duplex switch boards.

11 Claims, 9 Drawing Sheets

U.S. PATENT DOCUMENTS

| | | |
|---|---|---|
| 7,203,160 B1 * | 4/2007 | Lee .............................. 370/218 |
| 7,269,133 B2 * | 9/2007 | Lu et al. ..................... 370/219 |
| 2002/0097672 A1 | 7/2002 | Barbas et al. |
| 2003/0076778 A1 * | 4/2003 | Lee .............................. 370/225 |
| 2003/0128782 A1 | 7/2003 | Novak et al. |
| 2004/0044922 A1 * | 3/2004 | Wu .............................. 713/500 |
| 2005/0117571 A1 * | 6/2005 | Dyke .......................... 370/355 |
| 2006/0072480 A1 * | 4/2006 | Deval et al. ................. 370/254 |

FOREIGN PATENT DOCUMENTS

| | | |
|---|---|---|
| JP | 2002044058 A * | 2/2002 |
| KR | 1999-005390 | 1/1999 |
| KR | 1020010059942 A | 7/2001 |
| KR | 1020020048502 A | 6/2002 |
| KR | 1020030055374 A | 7/2003 |
| KR | 1020050040453 A | 5/2005 |

OTHER PUBLICATIONS

PICMG 3.0 Short Form Specification (pp. 1-33) Jan. 2003, PCI Industrial Computers Manufacturers Group (PICMG).

* cited by examiner

FIG. 9

APPARATUS AND METHOD FOR REDUNDANCY CONTROL OF DUPLEX SWITCH BOARD

FIELD OF THE INVENTION

The present invention relates to an apparatus for a redundancy control in a high-speed packet switching network and a method thereof; and, more particularly, to a redundancy control apparatus of a duplex switch board for a master clock switching or a redundancy switching in a unit of a plane without packet loss when a switchboard is malfunction, which can be applied to all of advanced telecommunications computer architecture (ATCA) based Shelves or Backplanes without modifying the Shelf or the Backplane, or an edge pin of a switch board according to capacitor variation of a switch or a router, and a method thereof.

DESCRIPTION OF THE PRIOR ART

According to population of Internet, data traffic increases, dramatically. Therefore, wide band transmission and high-speed switching function have been demanded. Whenever a backplane including a Shelf is modified, it requires modifying an edge pin in a switch board including a line card, where a high speed serial link is allocated. Therefore, a board manufacturing cost increases additionally.

Also, a conventional packet switch board is implemented as a non-blocking switch or as a fault tolerant switch for losing less packets and providing corresponding delay. Furthermore, a conventional packet switch board is implemented as a duplex type for control a simple buffer redundancy and for minimizing a packet loss. According, it is very difficult to implement the conventional packet switch board because of a complicated structure of a controller for controlling redundancy switching.

Figure 1:
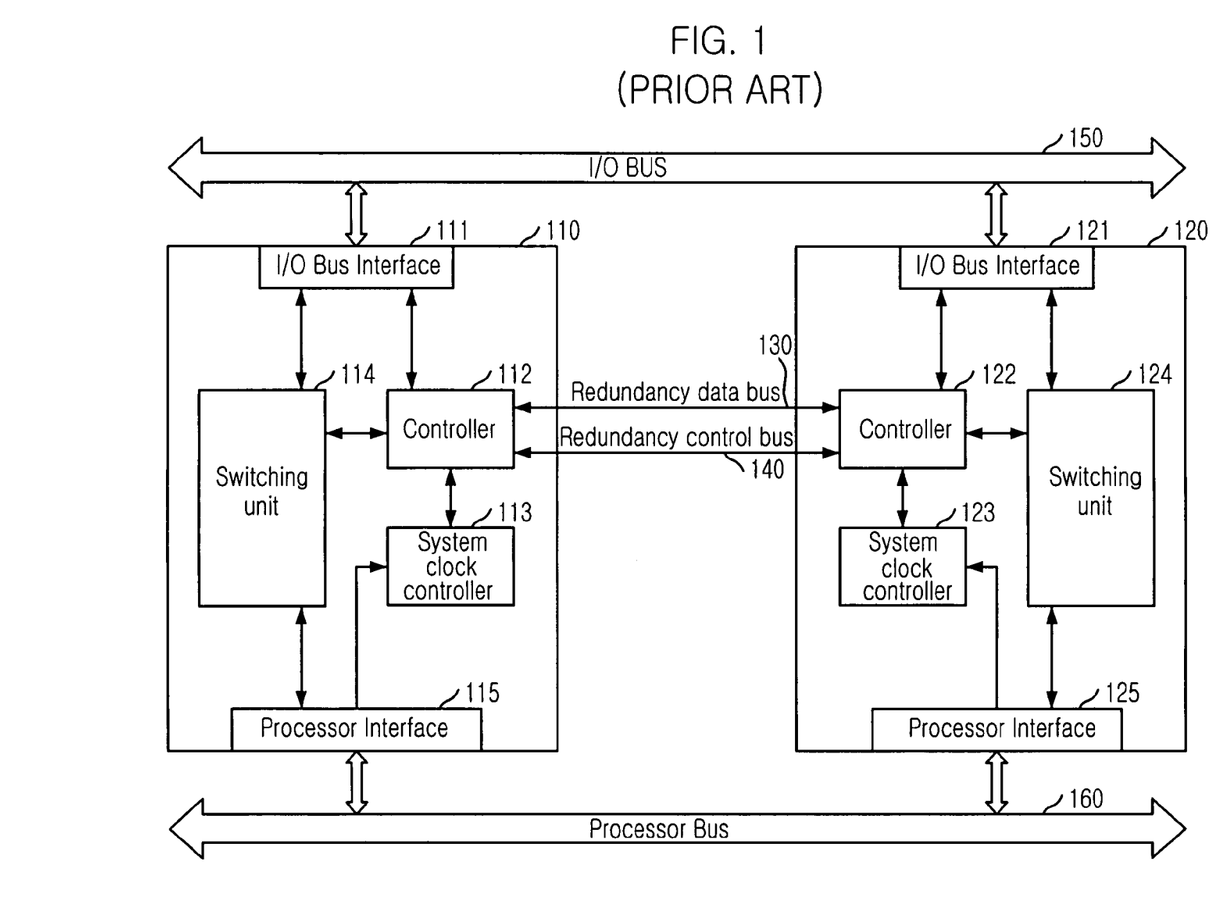
FIG. 1 is a block diagram illustrating a redundancy controller of a duplex switch board in accordance with a prior art.

FIG. 1 is a block diagram illustrating a redundancy controller of a conventional duplex switch board.

The conventional duplex switch board includes an input/output (I/O) bus 150, a first switch board 110, a second switch board 120 and a processor bus 160. Each of the first and the second switch board 110 and 120 includes: an I/O bus interface 111 or 121 for interfacing with the I/O bus 150; a switching unit 114 or 124 for switching data of corresponding processor interface 115 or 125; a controller 112 or 122 for analyzing states of the first switch board 110 and the second switch board 120 and exchanging data about the analyzed states through a redundancy data bus 130 and a redundancy control bus 140; a system clock controller 113 or 123 for controlling a system clock by receiving the state of the opponent switch board 110 or 120; and a processor interface 115 or 125 connected to the redundancy data bus 130 and the redundancy control bus 140 for interfacing the first switch board 110 and the second switch board 120 each other.

As shown in FIG. 1, the first switch board 110 and the second switch board 120 are connected each other by the redundancy data bus 130 and the redundancy control bus 140.

Hereinafter, a conventional method for operating the redundancy controller of the conventional duplex switch board will be explained with reference to FIG. 1.

At first, when electric power is applied to the first and the second switch board 110 and 120, the controllers 112 and 122 analyze states of the first and the second switch board 110 and 120, and exchange the analyzed states each other through the redundancy data bus 130 and the redundancy control bus 140. After exchanging, if the analyzed states of the two switch boards 110 and 120 are normal, an active switch board and a stand-by switch board are defined according to a priority. The active switch board is a board switching packets and the stand-by switch board is a board in a stand-by mode for redundancy control.

After defining, the system clock controller 113 or 123 of the stand-by switch board receives an own state and a state of an opponent switch board from the controller 112 or 122 and controls a system clock. While controlling, if the opponent switch board is in an active mode and if an external processor does not set or check the own state yet, the system clock controller interrupts to apply the system clock. As a result, an electric power consumed in the inactive switch board is reduced.

Although an electric power consumed in the inactive switch board is reduced by interrupting the system clock applied to the inactive switch board when the opponent switch board is in an active mode and an external processor does not set or check the own state yet, the conventional duplex switch board has a problem of high packet loss by asynchronous clock switching. That is, since the active switch board and the inactive switch board use own system clock, the conventional duplex switch board loses many packets if the active switch board and the inactive switch board are switched when a packet forwarding is achieved by interacting with a plurality of line cards.

Figure 2:
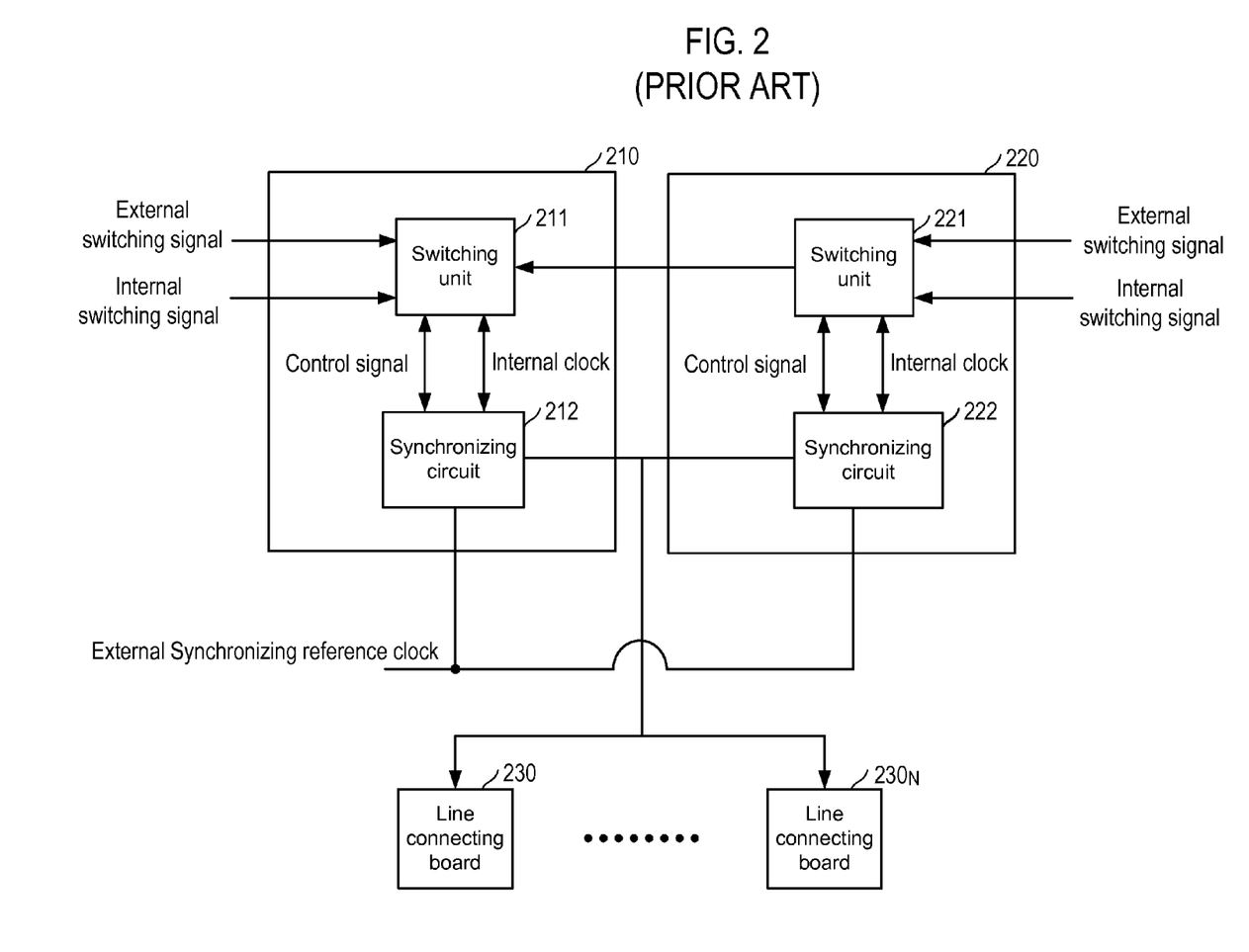
FIG. 2 is a block diagram showing a clock synchronizing device of a duplex switch board in accordance with a prior art.

As shown in FIG. 2, the conventional clock synchronizing device includes two switch boards 210, 220 and N line connecting boards 230 to 230$_N$.

As shown in FIG. 2, the conventional clock synchronizing device includes two switch boards 210, 220 and N line connecting boards 230 to 23n.

Each of switch boards 210, 220 includes a switching unit 211 or 221 for being switched according to an external switching signal and an internal switching signal; a synchronizing clock circuit 212 or 222 for generating a synchronized clock for N line connecting boards 230 to 230$_N$ by using an external synchronizing reference clock or a self-generated clock and applying the generated synchronized clock to each of the line connecting boards 230 to 230$_N$ when an own switch board is in an active mode.

Since the two switch boards 210 and 220 have a duplicated structure, if one of the two switch boards 210, 220 becomes the active switch board, another becomes the inactive switch board.

Each of the switching units 211 and 221 in the two switch boards 210 receives the external switching signal and the internal switching signal and performs a switching operation according to the external switching signal and the internal switching signal.

Each of the synchronizing clock circuit 212 or 222 generates the synchronized clock for N line connecting boards 230 to 23n by using an external synchronizing reference clock or a self-generated clock and applying the generated synchronized clock to each of the line connecting boards 230 to 24n when an own switch board is in an active mode.

When the synchronized clock is transmitted to the N line connecting boards 230 to 23n in the duplex two switch boards 210 and 220, the synchronized clock is transmitted by sharing a common channel.

Although the conventional clock synchronizing device shown in FIG. 2 supplies the synchronized clock to the N line connecting boards 23 to 23n through single channel, noises are generated by a portion connected to the inactive switch board operated as a stub.

Another conventional system for duplexing a clock is introduced in U.S. Pub. No. 0128782 A1 (Jul. 2003), now U.S. Pat. No. 6,839,391. In another conventional system, one of reference signals from two clock sources is selected in communication cards. Accordingly, duplex clocks can be properly used in a point-to-point structure. However, a hot swap function cannot be provided when redundancy switching. That is, a system becomes instable when the redundancy switching is performed on the duplex switches that are sources providing a clock in a switch or a router. Therefore, it is difficult to implement the conventional system introduced in U.S. Pub. No. 0128782 A1 to a switch or a router.

As described above, the conventional redundancy controller in the switch board instantly generates packet loss when redundancy switching because each of the switch boards uses a clock provided from an own clock controller. Therefore, there is a great demand for developing a high speed switching system providing fast redundancy switching, firm reliability and high stability.

SUMMARY OF THE INVENTION

It is, therefore, an object of the present invention to provide a redundancy control apparatus of a switch board compatible with an advanced telecommunications computer architecture (ATCA) standard platform without being modified or requiring additional boards although a Shelf or a Backplane is replaced, and a method thereof.

In accordance with one aspect of the present invention, there is provided a redundancy controller of duplex switch boards having an identical structure which are connected to a communication network system, the redundancy controller including: a switching unit for switching data inputted one of the duplex switch boards to a destination line card; a state controlling unit for controlling a clock state of an opponent switch board between the duplex switch boards; an IPC controlling unit for controlling an inter processor communication (IPC) of a platform of the communication network system; a processing unit for controlling the IPC controlling unit and the state controlling unit of the duplex switch boards; and a clock controlling unit for synchronizing a clock between the duplex switch boards.

In accordance with another aspect of the present invention, there is provided a method for controlling a redundancy in duplex switch boards having an identical structure which are connected to a communication network system, the method including the steps of: a) applying an electric power to the duplex switch boards and determining whether there is an error generated in the duplex switch boards; b) setting the duplex switch boards as a stand-by mode if there is no error generated in the duplex switch boards; c) determining whether an own clock is used or not, setting a switch board as an active mode if the own clock is used, and determining whether a clock of an opponent switch board is used or not if the own clock is not used; d) recognizing a switch operation failure by a clock fail and perform the step b) if the clock of the opponent switch board is not used, and determining whether the clock of the opponent switch board is normal or not by requesting a clock state response of the opponent switch board if the clock of the opponent switch board is used; and e) recognizing an switch operation failure and performing the step b) if the clock of the opponent switch is not normal, and checking a state of the opponent switch board and determining whether there is an error detected in the opponent switch board if the clock of the opponent switch board is normal.

In accordance with another aspect of the present invention, there is provided a method of controlling an inter processor communication (IPC) in duplex switch boards having identical hardware structure which are connecting to a communication network system, the method including the steps of: a) determining whether sub controllers are embedded in the duplex switch boards and an electric power is applied to an own sub controller; b) determining whether an electric power is supplied to an opponent sub controller of an opponent switch board if the electric power is not supplied to the own sub controller as a result of the step a), turning the electric power of the own sub controller off and performing the step a) if the electric power is supplied to the opponent sub controller, and turning the electric power of the own sub controller on and performing the step a) if the electric power is not supplied to the opponent sub controller; and c) determining an electric power is supplied to the opponent sub controller if the electric power is supplied to the own sub controller, controlling an electric power of the own sub controller by checking a board ID if the electric power is supplied to the opponent sub controller; turning on the electric power of the own sub controller and performing the step a) if the electric power is not supplied to the opponent sub controller.

In accordance with another aspect of the present invention, there is provided a method of controlling a cock in duplex switch boards having an identical hardware structure which are connected to a communication network system, the method including the steps of: a) selecting one of a hardware clock control method and a software clock control method based on a processing unit; b) checking a board ID and selecting one of two multi-point LVDS (MLVDS) bus channels as a transmitting channel (TX) for transmitting a clock and selecting another as a receiving channel (RX) for receiving the clock if the hardware clock control method is selected; and c) determining one of clocks provided from the duplex switch boards as a master clock.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings.

Figure 3:
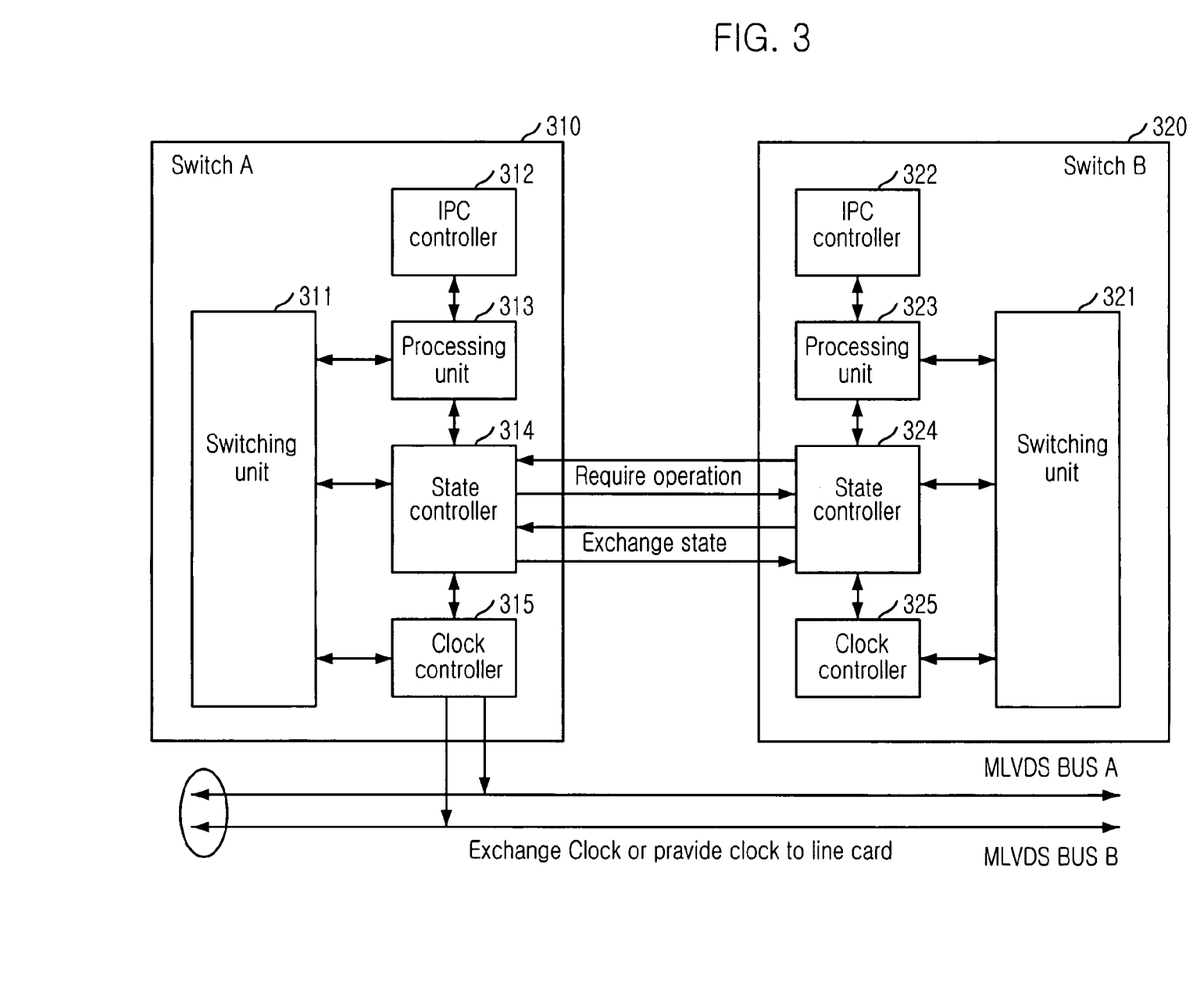
FIG. 3 is a block diagram illustrating a redundancy controller of a duplex switch board in accordance with a preferred embodiment of the present invention.

FIG. 3 is a block diagram illustrating a redundancy controller of duplex switch boards in accordance with a preferred embodiment of the present invention.

Referring to FIG. 3, the redundancy controller of the duplex switch boards according to the present embodiment includes: switching units 311, 321 for switching data inputted from one of the duplex switch boards to a destination line card; state controllers 314, 324 for controlling a clock state of an opponent switch board among the duplex switch boards; an inter processor communication (IPC) controllers 312, 322 for controlling an inter processor communication (IPC) on an advanced telecommunications computer architecture (ATCA) platform; processing units 313 323 for controlling the IPC controllers 312, 322 and the state controllers 314, 324; and clock controllers 315, 325 for synchronizing clocks between the duplex switch boards.

The switching units 311, 321 exchange packets between gigabit Ethernets, 10 gigabit Ethernets and a packet over sonnet (POS) line cards.

The IPC controllers 312, 322 provide an inter processor communication (IPC) channel through a base channel on an ATCA platform backplane to lines cards or main processors embedded in the ATCA platform as a shelf manager.

The processing units 313, 323 activate each switch port of the switching units 311 and 321, control controllers including the IPC controllers 312, 322, and supporting a programmable switch board redundancy by a main processor (not shown) of an ATCA based switching system.

The clock controllers 315, 325 provide a system clock to line cards and an opponent switch board embedded in an ATCA platform through a clock channel of a multi-point LVDS (MLVDS) level which is a standard of the ATCA platform backplane.

The state controllers 314, 324 analyzes whether a state of own clock is normal or abnormal, and exchanges a clock and a state of the opponent switch board.

The redundancy controller according to the present embodiment checks states of duplex switch boards and controls each switch board by using a service signal of each switch board and performs a switchover according to a command of a system main processor. Therefore, the duplex switch boards are automatically and instantly switched without packet loss when an internal error is generated in an active switch board.

Meanwhile, the redundancy controller according to the present embodiment performs the redundancy control through a switching step for switching inputted packets to a destination line card; an IPC controlling step for controlling an inter processor communication (IPC) of the ATCA platform; and a processing step for controlling the IPC controlling step of the switch boards 310 and 320, and the state controllers 314, 324; a state controlling step for controlling a clock state of opponent switch board 310 or 320; and a clock controlling step for synchronizing clocks between the duplex switch boards 310 and 320.

Figure 4:
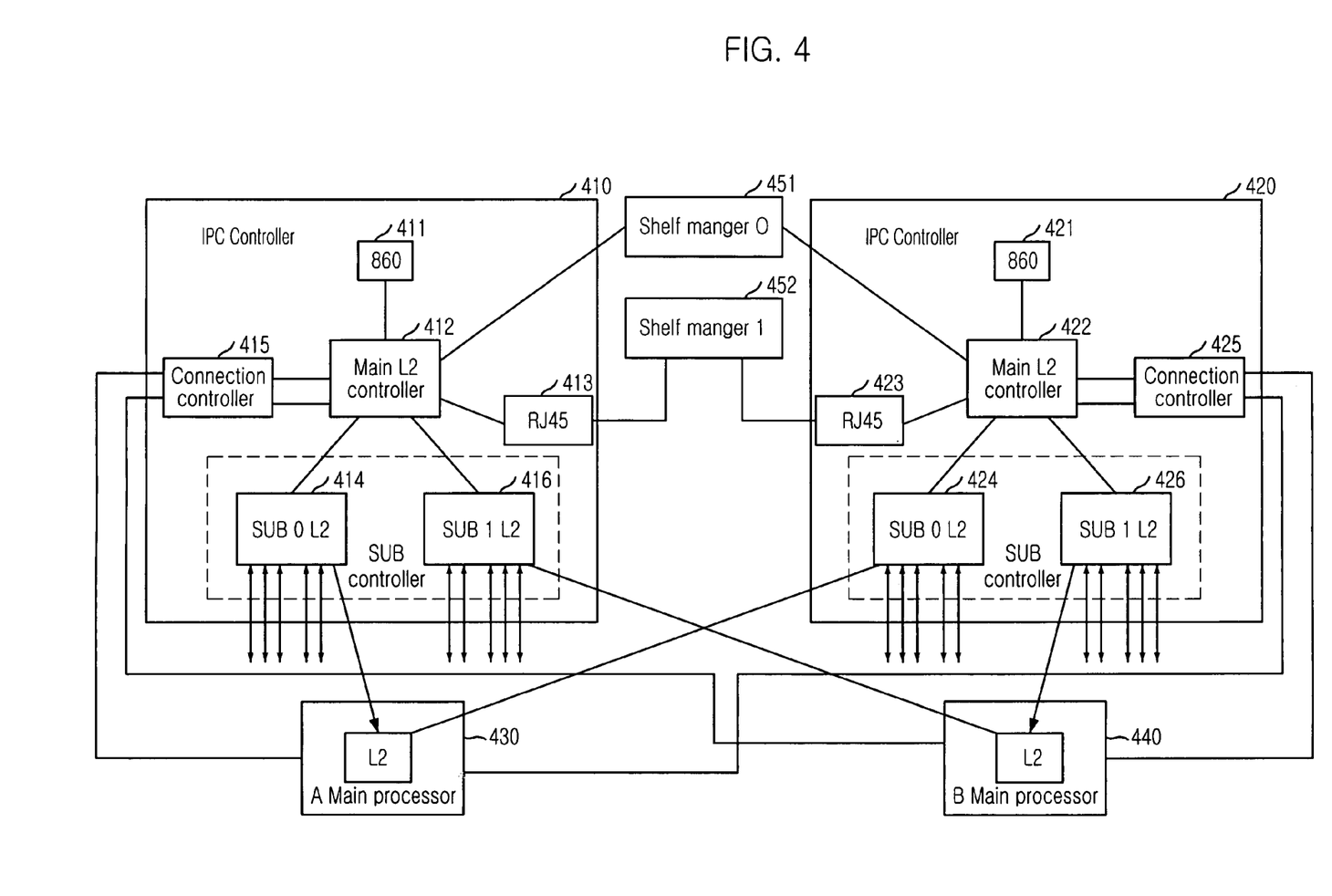
FIG. 4 is a block diagram showing an inter processor communication (IPC) controller of a redundancy controller in a duplex switch board in accordance with a preferred embodiment of the present invention.

FIG. 4 is a block diagram showing an inter processor communication (IPC) controller of a redundancy controller in a duplex switch board in accordance with a preferred embodiment of the present invention.

As shown in FIG. 4, the IPC controllers 410, 420 of the redundancy controller according to the present embodiment includes: main L2 controllers 412, 422 for providing an IPC channel to self managers 451, 452 of the ATCA platform and providing an IPC channel to the processing unit 313 or 323 of the opponent switch board; sub controllers 414, 416, 424, 426 for providing a path for establishing an IPC channel to each line card by using a base channel of the ATCA platform; connection controllers 415, 425 for cutting off a connection to the main processors 430, 440 to prevent to form a loop to the main processors 430, 440 when the sub controllers 414, 416, 424, 426 are embedded in the switch board, and establishing a connection to the main processors 430, 440 when the sub controllers 414, 416, 424, 426 are not embedded in the switch board; and RJ 45 connectors 413, 423 for an external IPC channel for redundancy pass to the shelf managers 451 and 452.

Provided controlling method of each of the IPC controllers 410, 420 in the redundancy controller is for an IPC channel redundancy control when the sub controllers 414, 416, 424, 426 are embedded in the switch board. That is, each of the IPC controllers 410, 420 turns electric power on or off according to a board ID provided from the ATCA platform or by checking a state of the opponent switch board.

Figure 5:
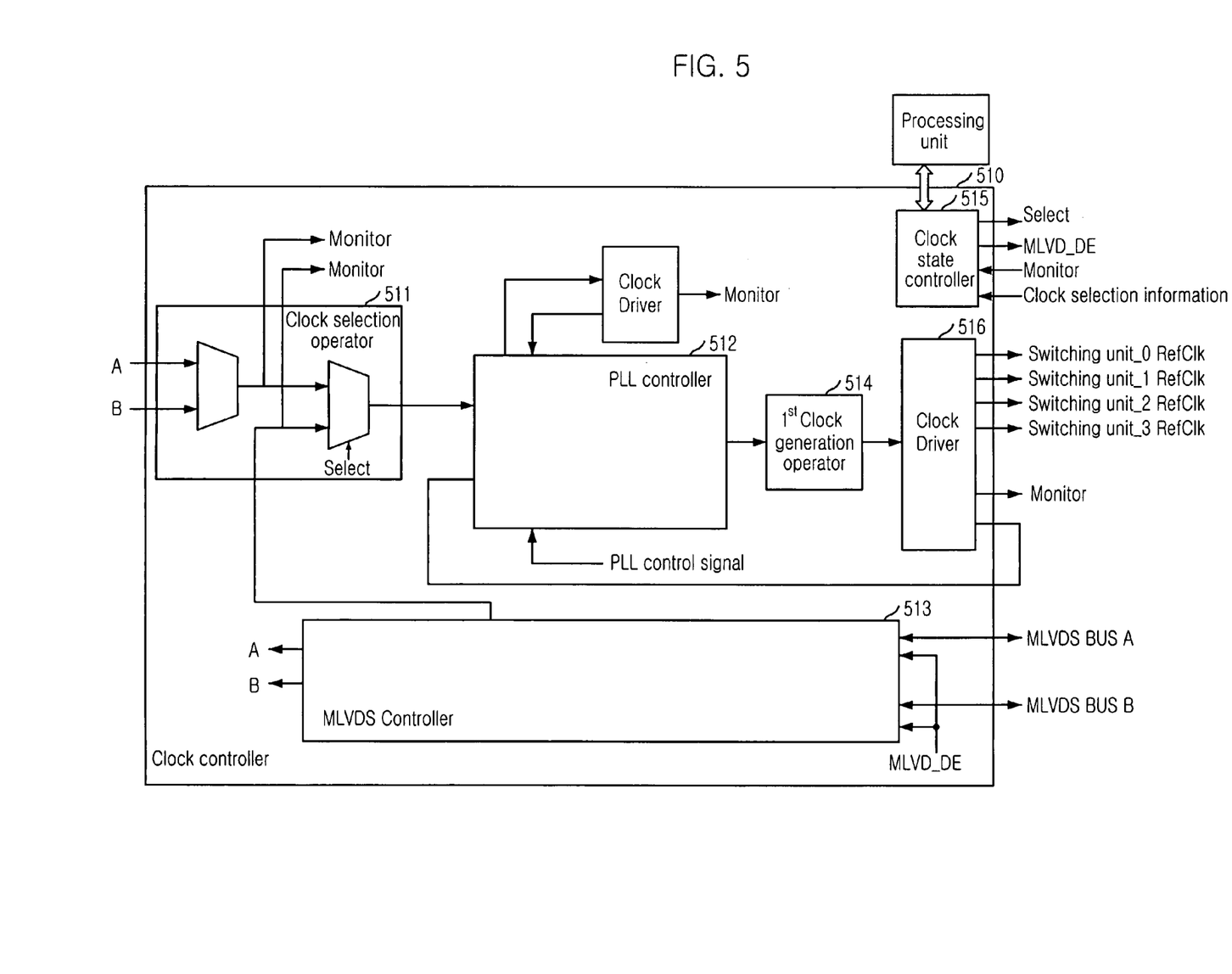
FIG. 5 is a block diagram depicting a clock controller of a redundancy controller in a duplex switch board in accordance with a preferred embodiment of the present invention.

FIG. 5 is a block diagram depicting a clock controller of a redundancy controller in duplex switch boards in accordance with a preferred embodiment of the present invention.

As shown in FIG. 5, the clock controller 510 includes: a MLVDS controller 513 for providing a multi-point LVDS signal through a clock channel of the ATCA backplane; a clock selection operator 511 for selecting one among a network synchronizing clock, a clock provided from the opponent switch board and a self-generated clock which is generated at own switch board as a master clock; a clock state controller 515 for monitoring clock states of a PLL controller 512 and a first clock generation operator 514, and controlling a signal that controls a MLVDS drive enable signal and selects a clock; and a clock driver 516 for providing a reference clock to each of switching units 311, 321.

The clock controller of the redundancy controller according to the present embodiment selects one of control by a hardware or a control by a software from the processing units 313, 323, and determines one of two MLVDS channels as a transmitting channel (TX) and another as a receiving channel (RX) by checking a board ID. And, the clock controller decides a master clock among clocks provided in a switch board.

Figure 6:
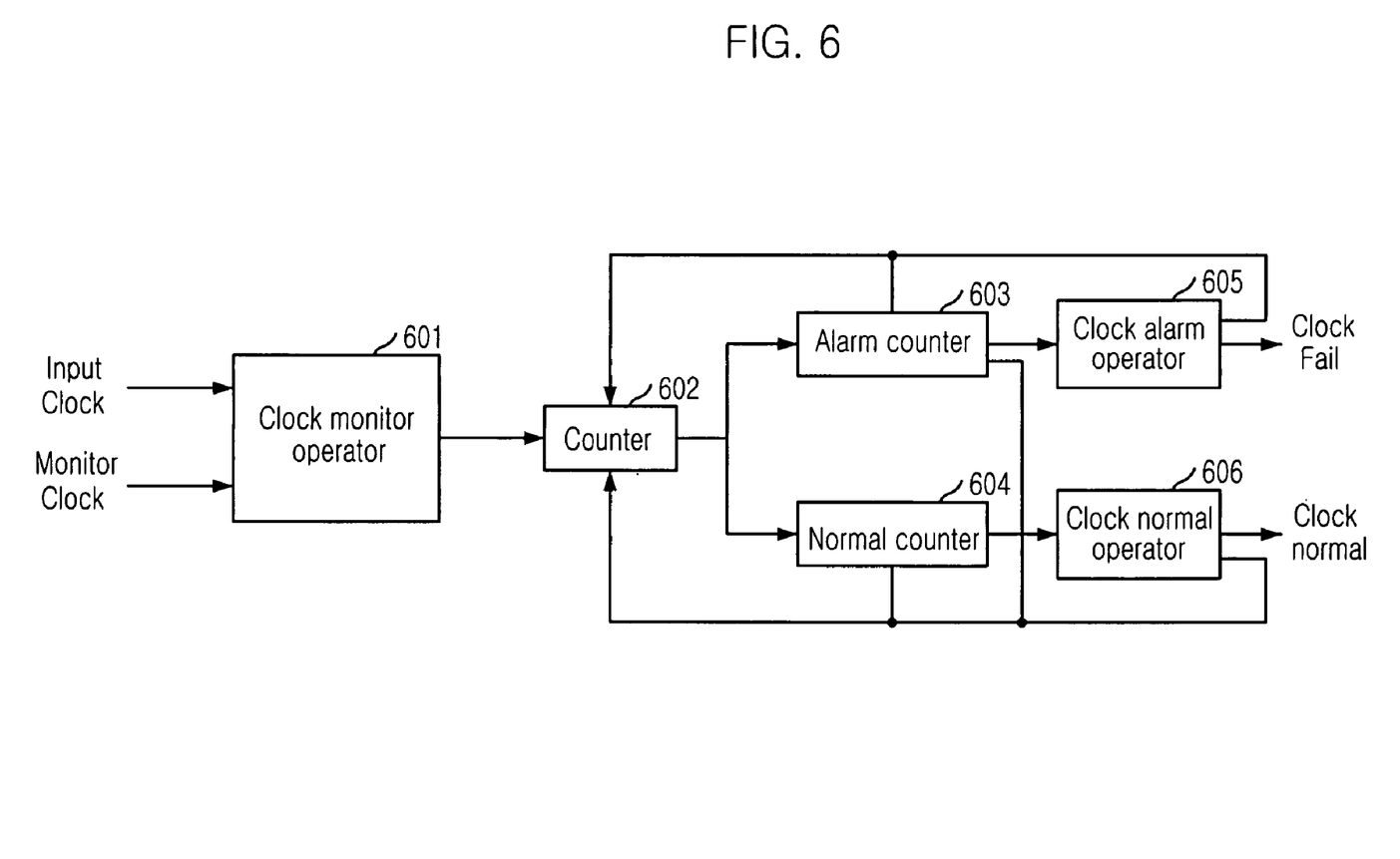
FIG. 6 is a block diagram illustrating a state controller of a redundancy controller in a duplex switch board in accordance with a preferred embodiment of the present invention.

FIG. 6 is a block diagram illustrating a state controller of a redundancy controller in a duplex switch board in accordance with a preferred embodiment of the present invention.

As shown in FIG. 6, the state controller includes: a clock monitor operator 601 for monitoring an input clock as a target clock by using a processor clock as a reference clock provided from a processing unit; a counter 602 increase a counter by one based on a reference clock by using a two-bit counter from output data of the clock monitor operator 601 when the target clock is constant as 0 or 1, and maintaining a value of the counter when the value of the counter is 2; an alarm counter 603 for counting a clock fail state by receiving a value from the counter 602; a normal counter 604 for counting a clock normal state by receiving a value of the counter 602; a clock alarm operator 605 for receiving a value of the alarm counter 603 and outputting a clock fail state when the value is larger than a predetermined threshold value, and clearing the alarm counter 603 and the normal counter 604; and a clock normal operator 606 for receiving a value of the normal counter 604, outputting a clock normal state when the value is larger than a predetermined threshold value and clearing the normal counter 604 and the alarm counter 603.

Figure 7:
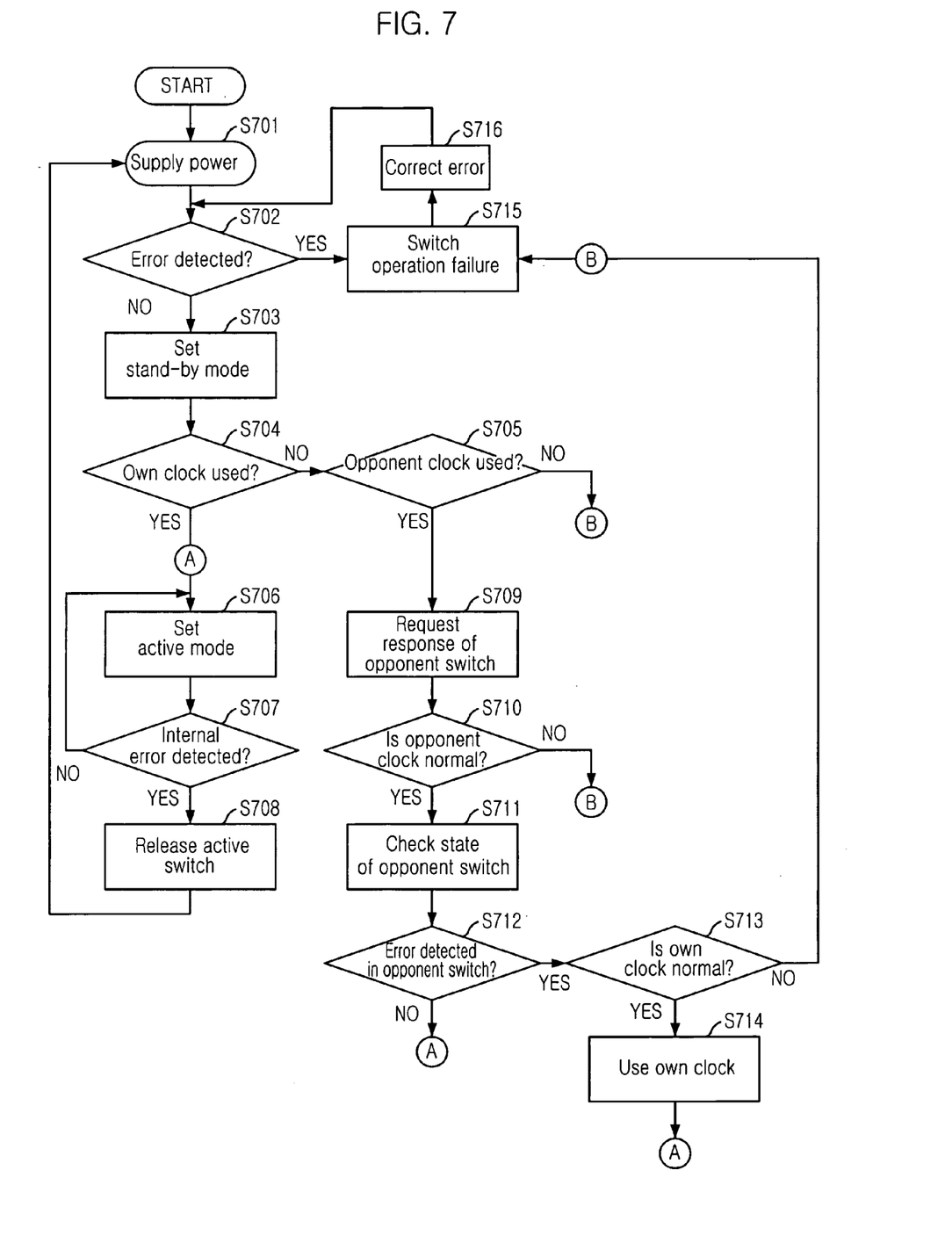
FIG. 7 is a flowchart of a method for a redundancy control of a duplex switch board in accordance with a preferred embodiment of the present invention.

FIG. 7 is a flowchart of a method for a redundancy control of a duplex switch board in accordance with a preferred embodiment of the present invention.

As shown in FIG. 7, an electric power is applied to an ATCA based duplex switch board at step S701 and it determines whether there is error detection in the duplex switch boards at step S702.

If there is an error detected, it is recognized as a switch operation failure at step S715 and the error is corrected at step S716. After correcting the error, the step S702 is performed again. If there is no error detected, a duplex switch board is set as a stand-by switch mode at step S703. One of duplex switch boards providing a service switching packets is an active switch board and another is a stand-by switch board.

After then, it determines whether an own clock is used or nor at step S704. If the own clock is used, a switch board is set as the active mode at step S706 and an inter error detection is performed at step S707 after setting the active mode.

If there is the internal error at step S707, the active mode is released at step S708 or if there is not, the active mode is maintained at step S706.

If the own clock is not used at step S704, it determines whether a clock of an opponent switch board is used or not at step S705.

If the clock of the opponent switch board is not used at step S705, it is recognized as a switch operation failure by a clock failure at step S715 and a board error is corrected at step S716. If the clock of the opponent switch board is used at step S705, a response of a clock state of the opponent switch board is requested at step S709. After then, it determines whether the clock of the opponent switch board is normal or not at step S710. If the clock of the opponent switch board is not normal, it is recognized as a switch operation failure at step S715. And, if the clock of the opponent switch board is normal, a state of the opponent switch board is checked at step S711 and it determines whether there is an error detected in the opponent switch board at step S712.

If there is not error in the opponent switch board at step S712, the active mode is set at step 706. If there is an error of a CPU or an electric power in the opponent switching board, it determines whether an own clock is normal or not at step S713. If the own clock is normal, the clock is switched to the own clock at step S714 and the active mode is set at step S706. If the own clock is not normal, it is recognized as a switch operation failure at step 715.

Figure 8:
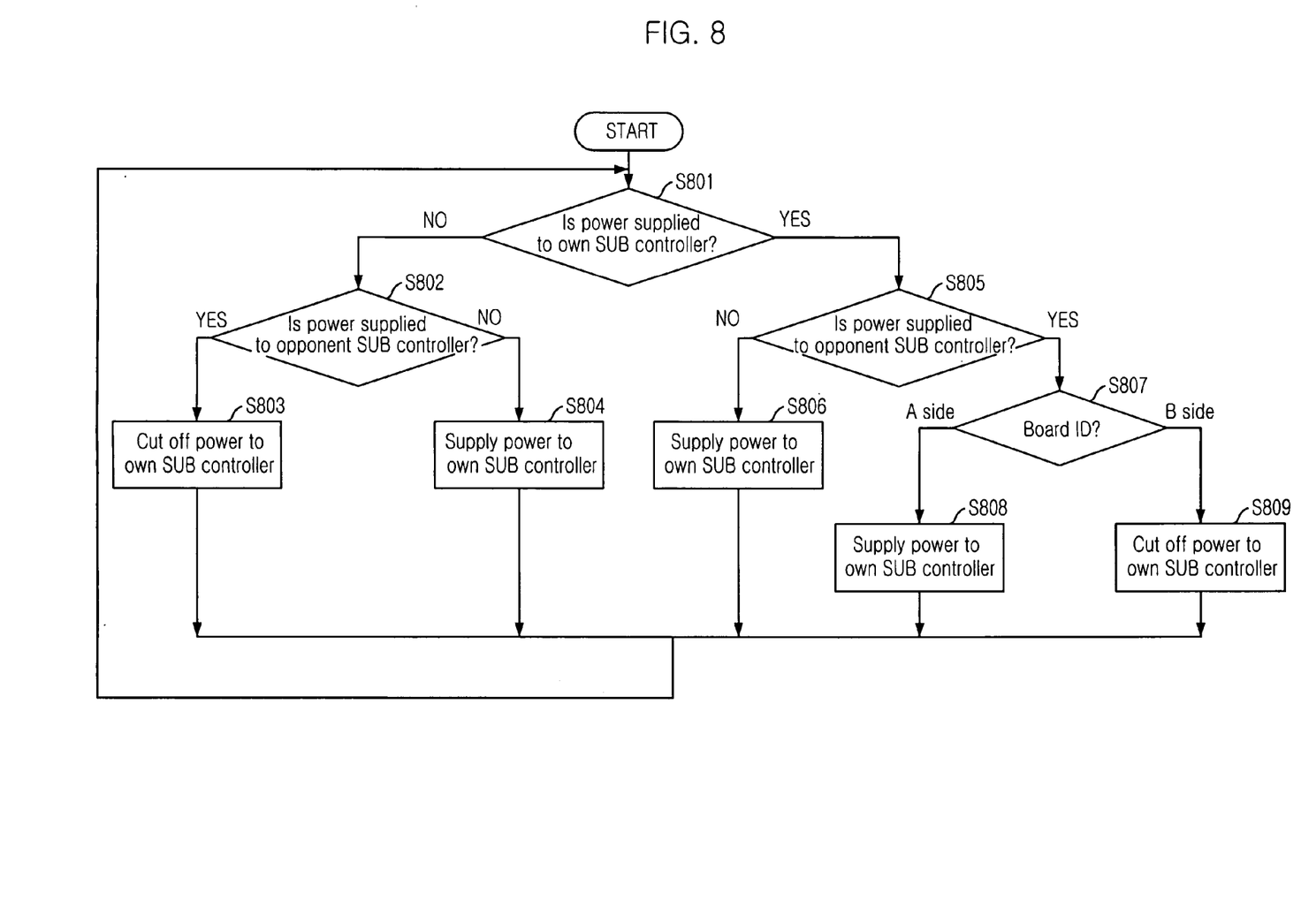
FIG. 8 is a flowchart of a method for controlling an inter processor communication (IPC) in an IPC controller a duplex switch board in accordance with a preferred embodiment of the present invention.

FIG. 8 is a flowchart of a method for controlling an inter processor communication (IPC) in an IPC controller a duplex switch board in accordance with a preferred embodiment of the present invention. The provided controlling method of the IPC controller is for an IPC channel redundancy control when the sub controllers 414, 416, 424, 426 are embedded in the switch board. That is, the IPC controller turns electric power on or off according to a board ID provided from the ATCA platform or by checking a state of the opponent switch board.

At first, it determines whether a sub controller is embedded in and an electric power is supplied to an own sub controller at step S801.

If the electric power is not supplied to the own sub controller at step S801, it determines whether an electric power is supplied to a sub controller of an opponent switch board at step S802. If the electric power is supplied to the sub controller of the opponent switch board at step S802, the electric power of the own sub controller is cut-off at step S803 and the step S801 is performed again for determining whether the electric power is supplied to the own sub controller. If the electric power is not supplied to the sub controller of the opponent switch board at step S802, an electric power of the own sub controller is turned on at step S804 and the step S801 is performed again.

If the electric power is supplied to the own sub controller at step S801, it determines whether an electric power is supplied to a sub controller of an opponent switch board at step S805.

If the electric power is supplied to the sub controller of the opponent switch board at step S805, a board Id is check at step S807. If the board ID is an A side, the electric power of the own sub controller is turned on at step S808 and the step S801 is performed again for determining whether the electric power is supplied to the own sub controller. If the board ID is a B side, the electric power of the own sub controller is turned off at step S809 and the step S801 is performed again for determining whether the electric power is supplied to the own sub controller.

If the electric power is not supplied to the sub controller of the opponent switch board at step S805, an electric power of the own sub controller is turned on at step S806 and the step S801 is performed again for determining whether the electric power is supplied to the own sub controller.

Figure 9:
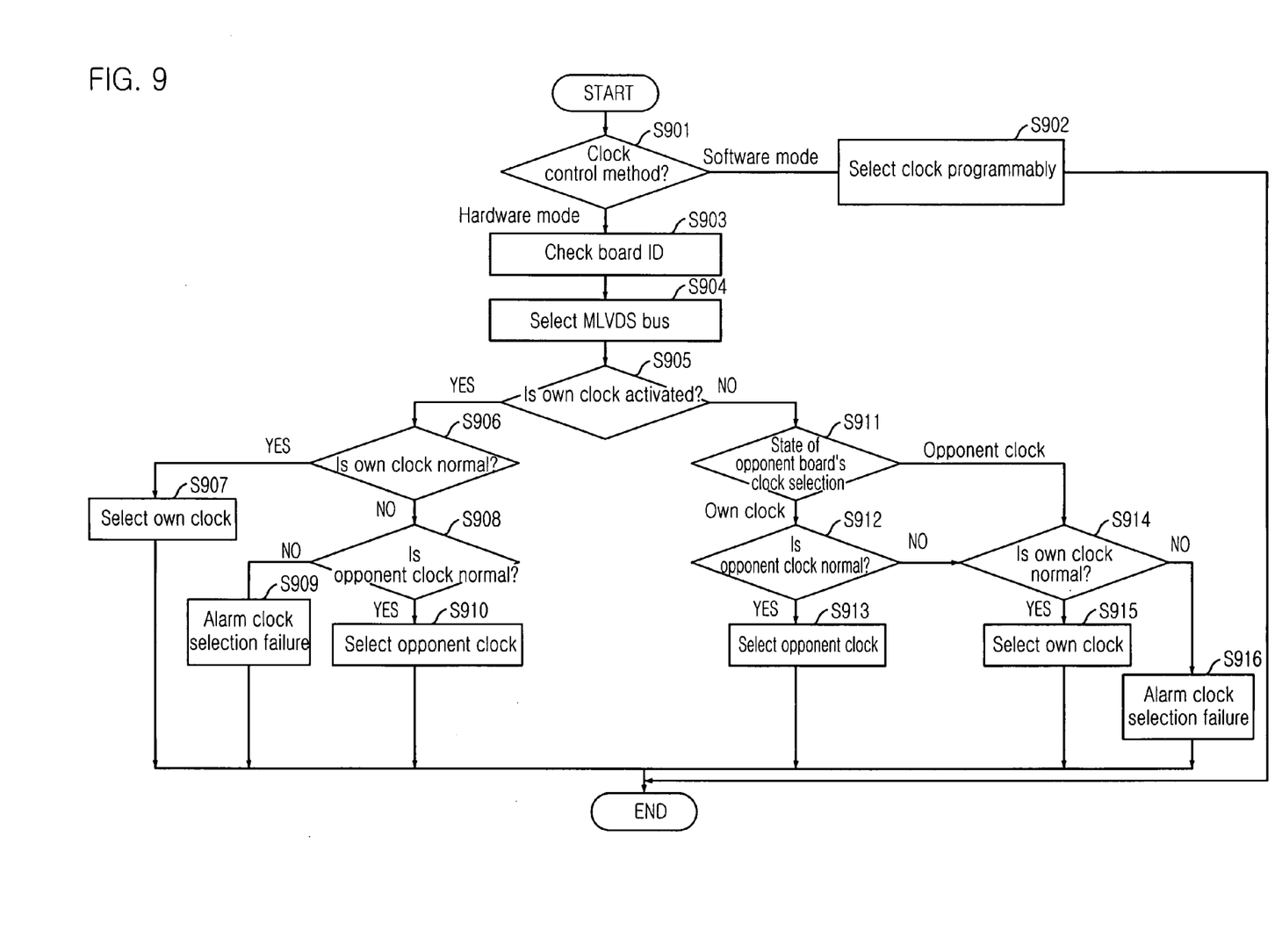
FIG. 9 is a flowchart of a method for controlling a clock in a clock controller a duplex switch board in accordance with a preferred embodiment of the present invention.

FIG. 9 is a flowchart of a method for controlling a clock in a clock controller a duplex switch board in accordance with a preferred embodiment of the present invention. For controlling a clock, the clock controller selects one of control by a hardware or a control by a software from the processing units 313, 323, and determines one of two MLVDS channels as a transmitting channel (TX) and another as a receiving channel (RX) by checking a board ID. And, the clock controller decides a master clock among clocks provided in a switch board.

As shown in FIG. 9, the clock controller determines whether a clock control method is a hardware mode or a software mode by the processing unit by embedding the duplex switch board in the ATCA Shelf at step S901.

If the clock control method is the software mode at step S901, a clock is selected programmable at step S902. If the clock control method is the hardware mode at step S901, a board ID is checked at step S903 and the duplex switch board selects one of a MLVDS A bus and a MLVDS B bus as a transmitting bus for transmitting a clock and selects another as a receiving bus for receiving a clock at step S904.

After selecting, it determines whether an own clock of each switch board is activated or not at step S905.

If the own clock is activated at step S905, it determines whether the own clock is normal or not at step S906. If the own clock is normal at step S906, the own clock is selected at step S907 and if not, a clock of the opponent switch board is checked at step S908. If the clock of the opponent switch board is not normal at step S908, it is recognized as a clock selection failure and output an alarm at step S909. If the clock of the opponent switch board is normal at step S908, the clock of the opponent switch board is selected at step S910.

If the own clock is inactivated at step S905, a clock selection state of an opponent switch board is checked at step S911.

If the clock of the opponent switch board is selected at step S911, it determines whether the clock of the opponent switch board is normal or not at step S912. If the clock of the opponent switch board is normal at step S912, the clock of the opponent switch board is selected at step S913. If the clock of the opponent switch board is selected at step S911, and if the clock of the opponent switch board is not normal at step S912, it determines whether an own clock is normal or not at step S914.

If the own clock is normal at step S914, the own clock is selected at step S915, and if not, it is recognized as a clock selection failure and outputs an alarm at step S916.

As described above, in order to overcoming a problem of the prior art that a Shelf or a Backplane, or an edge pin of a switch board must be modified according to capacity variation of a switch or a router, the redundancy controller of the switch board according to the present embodiment is designed to be compatible to the ATCA standard platform. Therefore, the redundancy controller of the switch board according to the present embodiment can be applied to all of the ATCA standard based Shelfs or Backplane. Also, the redundancy controller of the switch board according to the present embodiment can switch a master clock or perform a redundancy switching in a plane unit without packet loss when one of a switch board is malfunctioned. Accordingly, a reliability and a stability of a high speed switching system are improved. Furthermore, a conventional switch or a conventional router provides a channel for an inter processor communication (IPC) between a main processor and line cards. However, the duplex switch board according to the present invention is designed to provide the IPC channel to the main processor or the plurality of line cards by using a base channel of an ATCA Backplane zone 2 or to connect the main processor and the IPC channel through the ATCA Backplane zone 3 when the main processor provides the IPC channel by including the IPC controller in the duplex switch board.

As described above, the switch board of the present invention is designed to be compatible with the ATCA standard platform. Therefore, it does not require modifying the edge pin of the switch board or the Backplane when the Shelf or the Backplane are modified according to capacity variation of a switch or a router. Also, the conventional switch board or the conventional router individually provide a master clock to each line card by including a buffer for preventing unstable of a clock by a hot swap. However, the switch board of the present invention eliminates the conventional problem of the instable clock by providing a clock as a bus type to be compatible with the ATCA standard, and checking and controlling states of clocks when a clock is switched from an active board to a stand-by board. Therefore, a reliability and a stability of a high switch system are improved by designing the switch board to be compatible with the ATCA standard, and to switch a master clock and to perform a redundancy control in a plane unit without packet loss when one of switch board is malfunctioned.

The present application contains subject matter related to Korean patent application No. 2004-0097698, filed with the Korean Patent Office on Nov. 25, 2004, the entire contents of which being incorporated herein by reference.

While the present invention has been described with respect to the particular embodiments, it will be apparent to those skilled in the art that various changes and modifications may be made without departing from the scope of the invention as defined in the following claims.

What is claimed is:

1. A redundancy controller comprising:
    a switching means for switching data inputted from a first switch board of duplex switch boards to a destination line card;
    a state controlling means for controlling a clock state of a second switch board of the duplex switch boards, the duplex switch boards comprising the first and the second duplex switch boards, the duplex switch boards have an identical structure and are connected to a communication network system;
    an IPC controlling means for controlling an inter processor communication (IPC) of a platform of the communication network system;
    a processing means for controlling the IPC controlling means and the state controlling means; and
    a clock controlling means for synchronizing a clock between the duplex switch boards.

2. The redundancy controller as recited in claim 1, wherein the switching means exchanges data between Ethernet line cards.

3. The redundancy controller as recited in claim 1, wherein the state controlling means includes:
    a clock monitoring means for monitoring an input clock as a target clock by using a processor clock provided from the processing means as a reference clock;
    a counting means for increasing a value a counter by a predetermined value when the target clock is constant as a predetermined value by using a predetermined bit counter from output data from the clock monitoring means, and maintaining the value of the counter without increasing when the value of the counter becomes a predetermined value;
    an alarm counting means for counting a clock fail state by receiving a predetermined value from the counting means;
    a normal counting means for counting a clock normal state by receiving a predetermined value from the counting means;
    a clock alarm operating means for receiving a predetermined value from the alarm counting means and outputting a clock fail state when the received predetermined value from the alarm counting means is larger than a predetermined threshold and clearing the counting means, the alarm counting means and the normal counting means; and
    a clock normal operating means for receiving a predetermined value from the normal counting means and outputting a clock normal state when the received predetermined value from the normal counting means is larger than a predetermined threshold and clearing the counting means, the alarm counting means and the normal counting means.

4. The redundancy controller as recited in claim 1, wherein the IPC controlling means includes:
    a main controlling means for providing an inter processor communication (IPC) channel provided from the processing means as an IPC channel between the processing means and a shelf manager of a platform of the communication network system and as an IPC channel between the processing means and the second switch board;
    a sub controlling means for providing a patch to connect an IPC channel and each line card by using a base channel of a platform of the communication network system;
    a connection controlling means for cutting off a connection to prevent to form a loop to a main processor of the communication network system if the sub controlling means is embedded in the first switch board and for establishing the connection if the sub controlling means is not embedded in the first switch board; and
    a connecting means for connecting an external IPC channel for a redundancy path to a shelf manager of a platform of the communication network system.

5. The redundancy controller as recited in claim 1, wherein the processing means activates each switch port of the switching means, controls each controlling means including the IPC controlling means and supports a programmable switch board redundancy by a main processor of a switch system used in the communication network system.

6. The redundancy controller as recited in claim 1, wherein the clock controlling means includes:

a multi-point LVDS controlling means for providing a multi-point LVDS (MLVDS) signal through a clock channel of a Backplane of the communication network system;

a clock selecting means for selecting one of a synchronizing clock provided from the communication network system, a clock provided from the second switch board and a self-generated clock provided from the first switch board as a master clock;

a state controlling means for monitoring states of a phase locked loop (PLL) control, a clock generation and various clocks, and controlling a signal that controls a multi-point LVDS (MLVDS) drive enable signal and selects a clock; and a clock driving means for providing a reference clock to the switching means.

7. The redundancy controller as recited in claim 6, wherein the duplex switch boards controls state information of the duplex switch boards by using a service signal of the duplex switch boards, performs a redundancy switchover by a command of a main processor of the communication network system and automatically switches without data loss when there is an error generated in an active switch board.

8. A method for controlling a redundancy in duplex switch boards, the duplex switch boards comprising an own switch board and an opponent switch board, the duplex switch boards having an identical structure and being connected to a communication network system, the method comprising the steps of:

a) applying an electric power to the duplex switch boards and determining whether there is an error generated in the duplex switch boards;

b) setting the duplex switch boards as a stand-by mode if there is no error generated in the duplex switch boards;

c) determining whether an own clock is used or not, setting the own switch board as an active mode if the own clock is used, and determining whether a clock of the opponent switch board is used or not if the own clock is not used;

d) recognizing a switch operation failure by a clock fail and perform the step b) if the clock of the opponent switch board is not used, and determining whether the clock of the opponent switch board is normal or not by requesting a clock state response of the opponent switch board if the clock of the opponent switch board is used; and e) recognizing a switch operation failure and performing the step b) if the clock of the opponent switch is not normal, and checking a state of the opponent switch board and determining whether there is an error detected in the opponent switch board if the clock of the opponent switch board is normal.

9. The method as recited in claim 8, wherein in the step b), if there is an error as the result of the step b), it is recognized as a switch operation failure and the error is corrected.

10. The method as recited in claim 9, wherein in the step c), an internal error is checked after setting an active switch mode, the active switch mode is released if there is an error, and the active switch mode is maintained if there is no error.

11. The method as recited in claim 10, wherein in the step e), the setting an active mode in the step c) is performed if there is no error detected in the opponent switch board; an own clock is determined whether the own clock is normal or not if there is an error detected in the opponent switch board; the own clock is used by switching and the setting an active mode in the step c) is performed if the own clock is normal; and a switch operation failure is recognized if the own clock is not normal.

* * * * *